(12) United States Patent
Waddington et al.

(10) Patent No.: US 8,140,493 B2
(45) Date of Patent: Mar. 20, 2012

(54) CHANGING METADATA WITHOUT INVALIDATING CURSORS

(75) Inventors: William H. Waddington, Foster City, CA (US); Shrikanth Shankar, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1072 days.

(21) Appl. No.: 11/764,126

(22) Filed: Jun. 15, 2007

(65) Prior Publication Data

US 2008/0313623 A1 Dec. 18, 2008

(51) Int. Cl.
*G06F 7/00* (2006.01)

(52) U.S. Cl. ........ 707/695; 707/704; 707/694; 709/212; 715/229

(58) Field of Classification Search .......... 707/687–704; 709/215; 715/229
See application file for complete search history.

(56) References Cited

U.S. PATENT DOCUMENTS

| | | | |
|---|---|---|---|
| 6,002,866 A | 12/1999 | Fuller | |
| 6,003,036 A | 12/1999 | Martin | |
| 6,341,289 B1 | 1/2002 | Burroughs et al. | |
| 6,405,198 B1 | 6/2002 | Bitar et al. | |
| 6,867,991 B1 | 3/2005 | Tezcan et al. | |
| 7,143,091 B2 | 11/2006 | Charnock et al. | |
| 7,143,105 B2 | 11/2006 | Nakano et al. | |
| 7,146,377 B2 | 12/2006 | Nowicki et al. | |
| 7,334,002 B2 | 2/2008 | Byrne | |
| 7,356,549 B1 | 4/2008 | Bruso et al. | |
| 7,406,499 B2 | 7/2008 | Singh et al. | |
| 7,447,839 B2 | 11/2008 | Uppala | |
| 7,457,832 B2 | 11/2008 | Baird et al. | |
| 7,483,981 B2 | 1/2009 | Weinert et al. | |
| 7,617,370 B2 | 11/2009 | Jernigan et al. | |
| 7,698,334 B2 | 4/2010 | Kazar et al. | |
| 7,716,420 B2 | 5/2010 | Gole et al. | |
| 7,774,329 B1 | 8/2010 | Peddy et al. | |
| 7,890,541 B2 | 2/2011 | Teng et al. | |
| 7,949,865 B1 | 5/2011 | Yadav | |

(Continued)

OTHER PUBLICATIONS

Oracle Corporation, Oracle8 Concepts Release 8.0 A58227-01, 14 SQL and PL/SQL, http://download-east.oracle.com/docs/cd/A58617_01/server.804/a58227/ch11.htm#1561, printed Sep. 26, 2007, pp. 1-17.

(Continued)

*Primary Examiner* — Wilson Lee
*Assistant Examiner* — Tuan-Khanh Phan
(74) *Attorney, Agent, or Firm* — Hickman Palermo Truong & Becker LLP; Karl T. Rees

(57) ABSTRACT

A method and apparatus for changing versioned metadata without invalidating cursors is provided. Cursors may be linked to the appropriate version of metadata at execution time as opposed to compilation time, meaning that they do not require recompilation to link to a new version of metadata. A database system maintains compiled code implementing a plan with respect to data items in a data storage space. The compiled code may have been generated in response to receiving a request to perform an operation that may be implemented using the plan. A version of metadata is also maintained. The metadata describes characteristics of the data storage space implicated by the plan. The compiled code is executed. The step of execution comprises binding the compiled code to the version of metadata. A proxy object referenced in the compiled code may facilitate the binding of the compiled code to the appropriate version of metadata.

38 Claims, 6 Drawing Sheets

U.S. PATENT DOCUMENTS

| | | |
|---|---|---|
| 2004/0260671 A1 | 12/2004 | Potter et al. |
| 2004/0267782 A1 | 12/2004 | Nakano et al. |
| 2005/0187897 A1 | 8/2005 | Pawar et al. |
| 2006/0004886 A1* | 1/2006 | Green et al. .................. 707/203 |
| 2006/0206507 A1 | 9/2006 | Dahbour |
| 2006/0253431 A1 | 11/2006 | Bobick et al. |
| 2007/0239793 A1 | 10/2007 | Tyrrell et al. |
| 2007/0260842 A1 | 11/2007 | Faibish et al. |
| 2008/0091690 A1 | 4/2008 | Ellersick et al. |
| 2008/0104359 A1 | 5/2008 | Sauer et al. |
| 2008/0114749 A1 | 5/2008 | Chandhok et al. |
| 2008/0140937 A1 | 6/2008 | Nalawade et al. |
| 2008/0228829 A1 | 9/2008 | Crutchfield et al. |
| 2008/0256029 A1 | 10/2008 | Abrink |

OTHER PUBLICATIONS

Oracle Corporation, Oracle9*i* Database Concepts Release 2 (9.2), Part No. A96524-01, 15 Dependencies Among Schema Objects, http://download-east.oracle.com/docs/cd/B10501_01/server.920/a96524/c19depnd.htm#369, printed Sep. 26, 2007, pp. 1-10.

Oracle Corporation, Oracle® Database Application Developer's Guide—Object-Relational Features 10g Release 1 (10.1) Part No. B10799-01, 7 Advanced Topics for Oracle Objects, http://download-east.oracle.com/docs/cd/B14117_01/appdev.101/b10799/adobjadv.htm, printed Sep. 26, 2007, pp. 1-25.

* cited by examiner

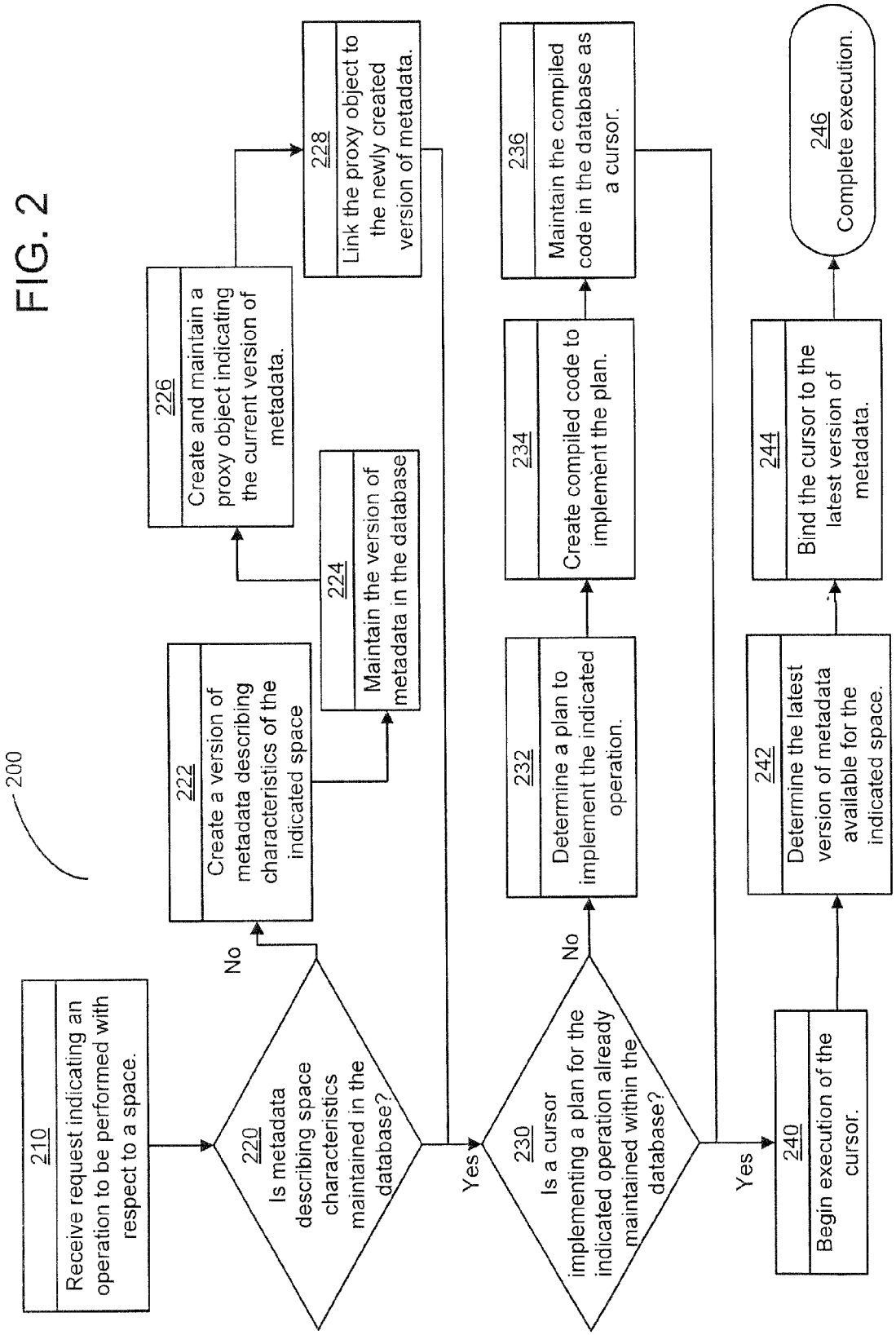

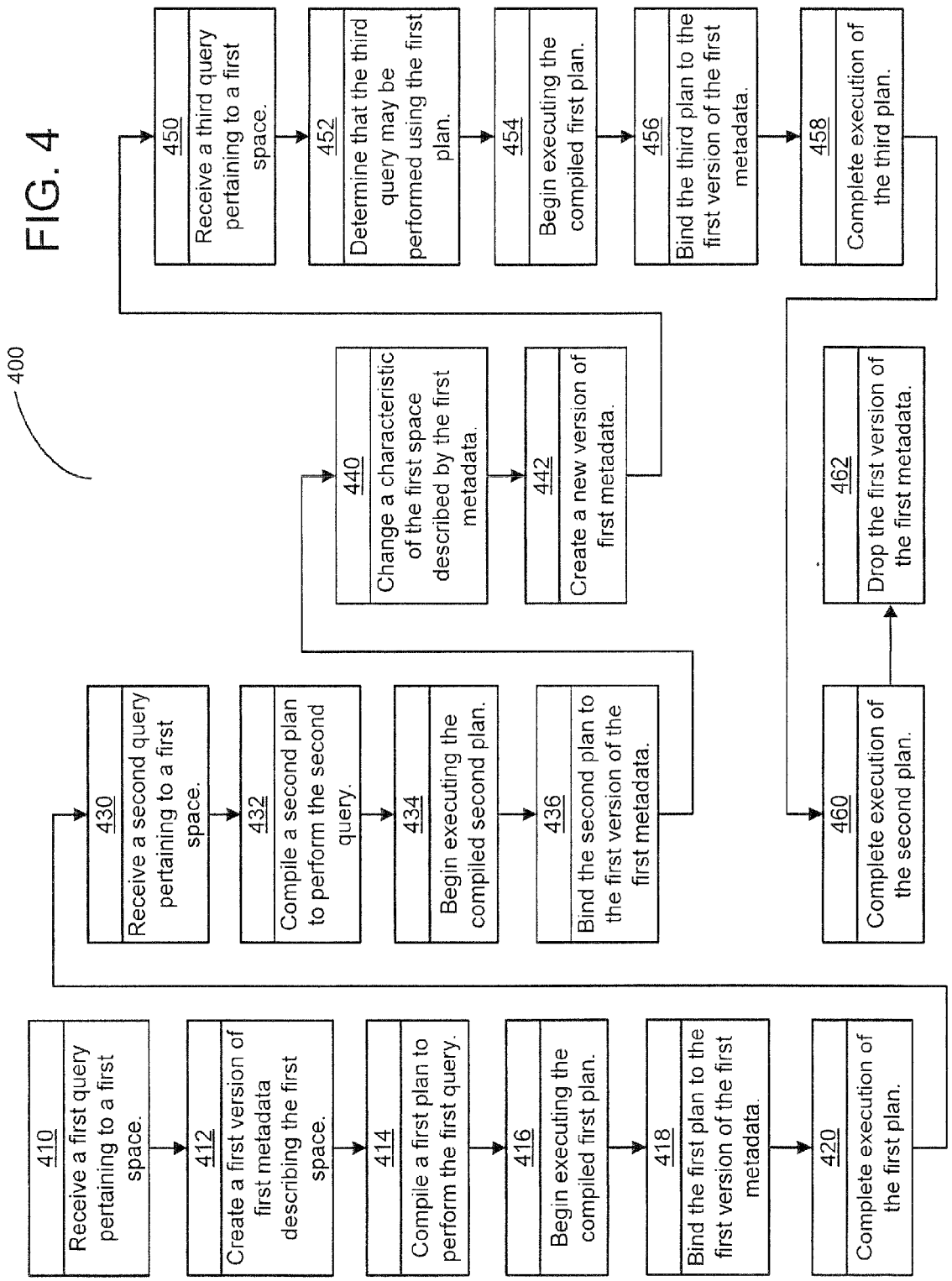

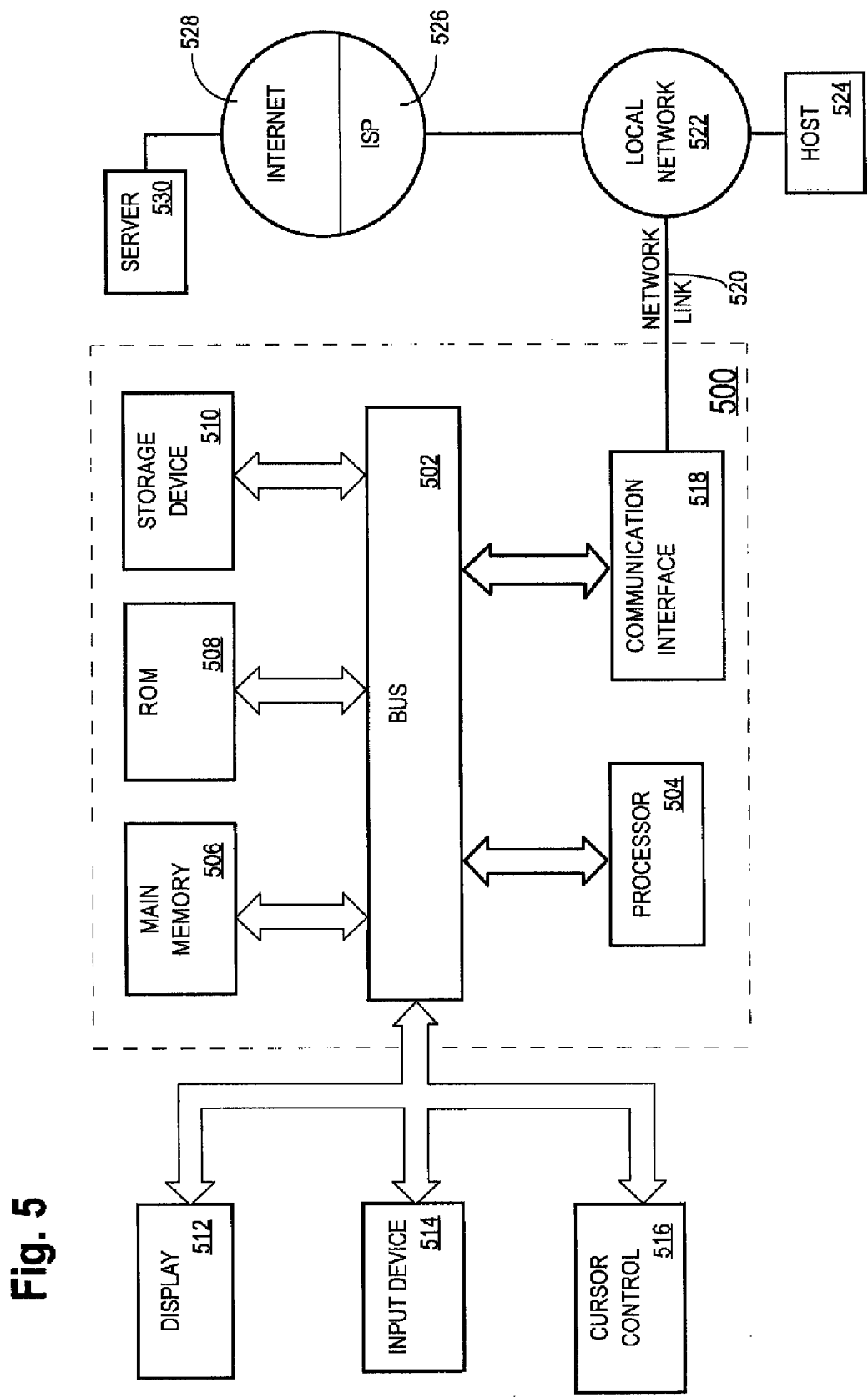

CHANGING METADATA WITHOUT INVALIDATING CURSORS

FIELD OF THE INVENTION

The present invention relates to data storage and retrieval and, more particularly, to maintaining compiled representations of storage and retrieval plans.

BACKGROUND

A database system may use plans to execute operations relating to the data stored in that database's data storage spaces (e.g., relational tables). Plans may be formulated in response to requests for the database system to perform operations such as storing, retrieving, and manipulating data. These requests may come in a variety of forms known within the art, including structured query language (SQL) and data definition language (DDL) statements and blocks. Techniques for determining plans to execute requested database operations are well-known within the art.

Plans may be converted into compiled representations before execution. A compiled representation of a plan is an internal representation that may be quickly executed by the database system. For example, the compiled representation may be in a language more native to the computer or operating system on which the database system is running. Alternatively, the compiled representation may be in an optimized form whereby the database system may execute the plan with minimal additional lookups or input. A compiled representation is also known within the art as a program unit or cursor.

Cursors may be maintained for reuse. If, after creating a cursor for a plan, a database system needs to perform the same plan additional times, the database system may locate the cursor that the database system created the first time and execute the plan using that cursor instead of compiling a new cursor. For example, if a database system receives the SQL statement SELECT * FROM tab1 multiple times, the database system may use the same cursor to execute the plan indicated by the statement each time. As is known within the art, parameters may be used to create more generalized cursors, thereby increasing those cursors' reuse potential. For example, the plan described by the statement SELECT name FROM tab1 WHERE id=10 could be executed by a cursor for the plan SELECT name FROM tab1 WHERE id=%1, where the value of the %1 parameter is 10. Since cursor compilation requires a relatively large amount of time and memory, a database system can greatly increase efficiency by maintaining cursors for reuse.

Cursors may utilize metadata describing the data storage spaces to which those cursors may require access. This metadata may contain, for example, segment addresses for each partition in the data storage space. Metadata can further increase efficiency by reducing or eliminating the amount of time that a cursor must spend looking up information about data storage spaces.

Some database systems store private copies of the metadata needed by each cursor inside the cursors themselves. This technique wastes memory resources; each cursor that accesses a particular data storage space may store that cursor's own identical copy of the metadata for that storage space. Since the size of metadata increases proportionally with the number of partitions in a data storage space, the resource waste resulting from metadata duplication is even further compounded for data storage spaces with many partitions.

To overcome this problem, some database systems store shared copies of metadata external to the cursors. When the cursors are compiled, those cursors are linked in the compiled code to a shared copy of the metadata that those cursors require. Many cursors may be linked to the same shared copy of metadata. Such a technique is described in U.S. application Pub. No. 20060004755, entitled "System for allowing object metadata to be shared between cursors for concurrent read write access," filed on May 13, 2005, which is hereby incorporated by reference. Certain plans may change characteristics of the data storage space described by the metadata, such as the number of partitions in the data storage space. In order to prevent complications that may arise from one cursor changing metadata while another cursor is using that same metadata, cursors whose actions may result in changing the metadata are placed on hold until all other cursors are finished using the shared metadata. However, this can result in a bottleneck effect, greatly reducing the efficiency of the database system.

These complications may be confronted by versioning the shared metadata, as described in U.S. application Pub. No. 20060004886, entitled "System for managing versions of cached metadata," filed on May 13, 2005, which is also hereby incorporated by reference. When any characteristic of the data storage space described by the metadata changes, a new version of the metadata is created. Any cursors that were executing using the previous version of the metadata may continue to execute until those cursors have completed those cursors' plans; however, under such an approach, any cursor whose execution begins after the new version of the metadata is created must be recompiled to link to the new version of the metadata. This solution allows many cursors to run concurrently using the same metadata. However, a change in metadata invalidates cursors, inevitably requiring recompilation.

It is desirable to facilitate the changing of versioned metadata without invalidating cursors and requiring recompilation.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

Techniques are provided for changing versioned metadata without invalidating cursors and requiring recompilation. Cursors may be linked to the appropriate version of metadata at execution time as opposed to compilation time, meaning that those cursors do not require recompilation to link to a new version of metadata.

According to one embodiment, compiled code (i.e., a cursor) is maintained. The compiled code implements a plan with respect to data items in a data storage space within a database system. The compiled code may have been generated in response to receiving a request to perform an operation that may be implemented using the plan, for example. A version of metadata is also maintained. The metadata describes characteristics of the data storage space that is implicated by the plan. The compiled code is executed. The step of execution comprises binding the compiled code to the version of the metadata. A proxy object referenced in the compiled code may facilitate the binding of the compiled code to the appropriate version of metadata.

According to one embodiment, a first query that pertains to a data storage space is received. A version of metadata that describes characteristics of the space is created. A first plan to execute the first query is compiled. The first query is subsequently executed via the compiled first plan. The step of executing the first query comprises binding the first plan to the version of the metadata. A second query pertaining to the space is received. A second plan to execute the second query is compiled. The second query is subsequently executed via the compiled second plan. The step of executing the second query comprises binding the second plan to the version of the metadata. A proxy object referenced in the compiled code of the first and second plan may facilitate the binding of the compiled code to the appropriate version of the metadata.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a flowchart that illustrates a technique for executing a plan in accordance with an embodiment of the invention.

FIG. 4 is a flowchart illustrating database operations according to an embodiment of the invention.

FIG. 5 is a block diagram that illustrates a computer system upon which an embodiment of the invention may be implemented.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Exemplary Database System

Figure 1A:
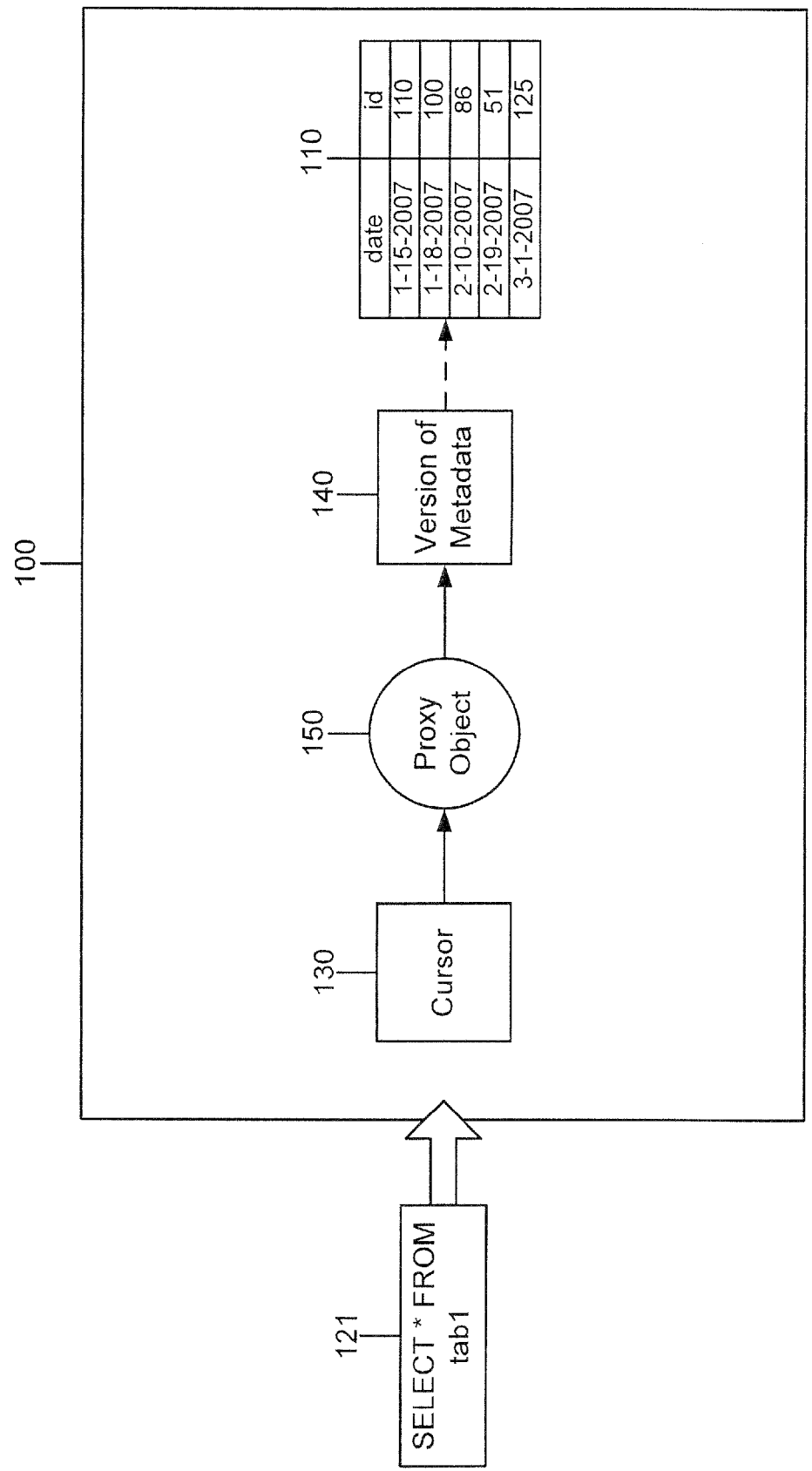
FIG. 1A illustrates an exemplary database system, according to an embodiment of the invention.

FIG. 1A illustrates an exemplary database system, according to an embodiment of the invention. Database system 100 is an exemplary database system that comprises data storage space 110. Data storage space 110 may be, for example, a relational table.

Request 121 is a request to perform an operation relative to data storage space 110. Request 121 may be in any form capable of being interpreted by database system 100, including SQL and DDL. In response to receiving request 121, database system 100 determines that database system 100 currently has no plan capable of performing request 121. Consequently, database system 100 determines a plan capable of performing request 121. This plan is maintained in database system 100 as cursor 130, which is a compiled representation of the plan. Request 121 may subsequently be fulfilled by executing cursor 130.

Database system 100 also maintains a version of metadata 140, which describes certain characteristics of space 110. The described characteristics may comprise any information about space 110 that a cursor performing an operation with relation to space 110 might otherwise have had to determine on that cursor's own, including information about partitions and those partitions' respective segment addresses. Version of metadata 140 may be in any form capable of conveying those characteristics to cursor 130, such as in an object or structure in the database. Version of metadata 140 may have been generated in database system 100 in response to a number of events, including the initialization of database system 100, creation or allocation of data storage space 110, a change in a characteristic of data storage space 110, or the receipt of a request pertaining to data storage space 110, such as request 121.

According to one embodiment, whenever cursor 130 is executed, the execution instance of cursor 130 is linked (i.e., bound) to the latest (as of initial execution time) version of metadata for space 110. This linking may be facilitated by accessing proxy object 150. Cursor 130 references proxy object 150 in the compiled code of cursor 130. Proxy object 150 indicates the latest version of metadata created for space 100. Proxy object 150 currently indicates version of metadata 140, which is the current version of metadata for space 110. Proxy object 150 may be a separate object comprising a pointer to the latest metadata version. Proxy object 150 may also be a versioned object, further comprising version of metadata 140, as well as any other existing versions of metadata for space 110.

Though not depicted in FIG. 1A, database system 100 may also employ versioning and locking mechanisms, as known within the art.

Reusing Cursors and Metadata

Figure 1B:
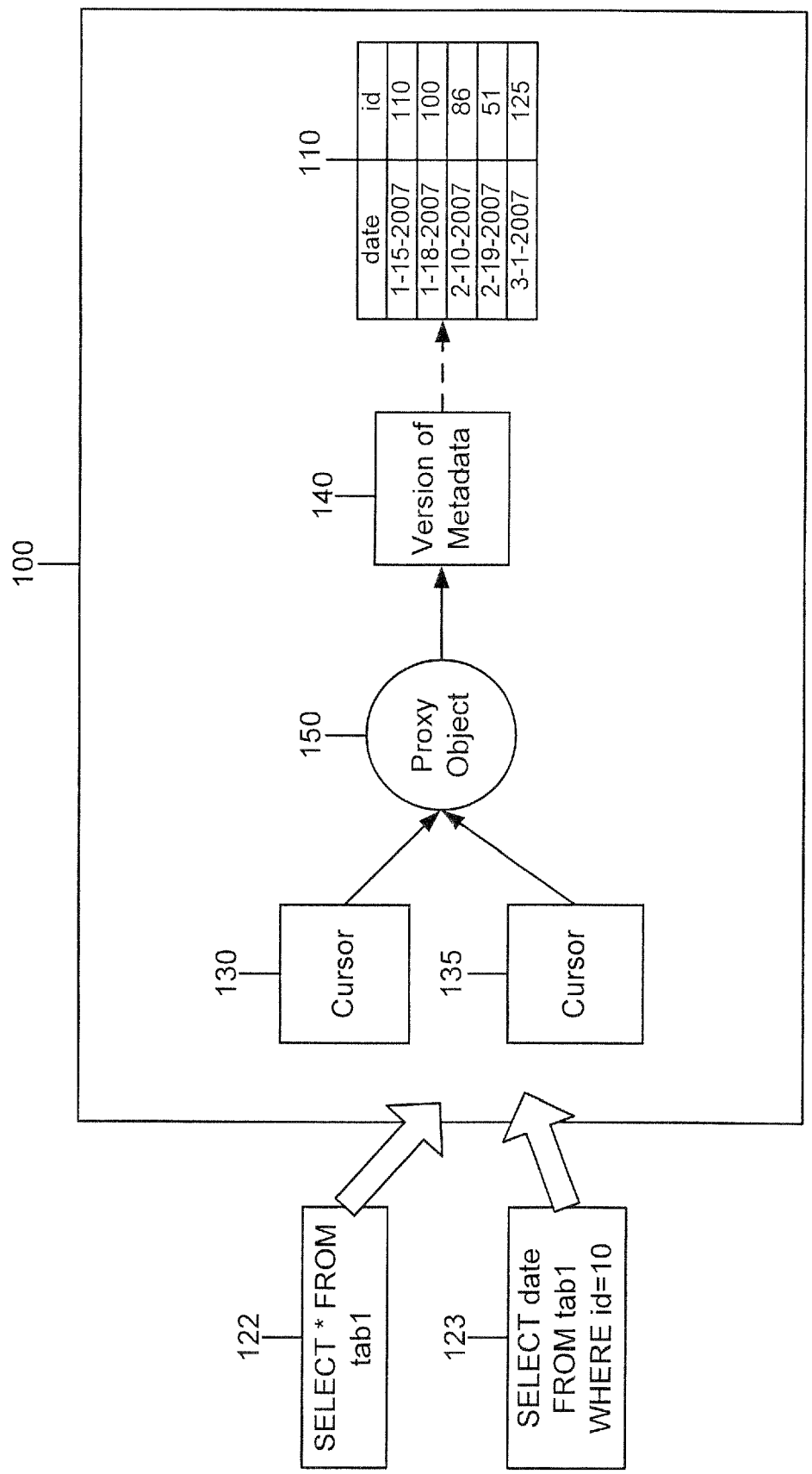
FIG. 1B illustrates a system in which cursors and metadata are reused in the exemplary database system, according to an embodiment of the invention.

FIG. 1B illustrates a system in which cursors and metadata are reused in the exemplary database system of FIG. 1A, according to an embodiment of the invention.

Request 122 is a request to perform an operation relative to data storage space 110. In response to receiving request 122, database system 100 determines that a compiled representation of a plan capable of implementing request 122 already exists—namely, cursor 130. Since no new cursor or metadata is required to perform request 122, no changes in database system 100 result from receiving request 122. Both cursor 130 and version of metadata 140 may subsequently be re-used to fulfill request 122.

Request 125 is a request to perform an operation relative to data storage space 110. In response to receiving request 125, database system 100 determines that database system 100 has no plan capable of fulfilling request 125. Consequently, database system 100 determines a plan capable of performing request 125. This plan is maintained in database system 100 as cursor 135, which is a compiled representation of the plan. Request 125 may subsequently be fulfilled by executing cursor 130.

Since metadata for space 110 already exists within database system 100, database system 100 did not generate any new metadata in response to request 125. Instead, cursor 135 is linked to proxy object 150, which indicates the current version of metadata for space 110. Because proxy object 150 currently indicates version of metadata 140, version of metadata 140 may be reused to fulfill request 125.

Binding Metadata at Execution Time

FIG. 2 is a flowchart that illustrates a process flow 200 for executing a plan in accordance with an embodiment of the invention.

In step 210 of process flow 200, a request is received. The request indicates an operation to be performed relative to a data storage space in a database. This request may be in any form capable of being interpreted by the database, including SQL and DDL. For example, database system 100 may receive request 122.

In step 220, a determination is made concerning whether a version of metadata that describes characteristics of the space indicated in step 210 is currently maintained in the database. For example, database system 100 may determine whether a version of metadata such as version of metadata 140 is currently maintained. If this metadata already exists, then control passes to step 230. Such metadata may have been created upon initialization of the database or data storage space, or such metadata may have been generated in response to a previously received request. However, if the metadata does not exist, then control passes to step 222.

In step 222, a version of metadata that describes characteristics of the indicated space is created. For example, database system 100 may create version of metadata 140. This metadata may describe certain characteristics of the indicated space. The described characteristics may comprise any information about the indicated space that a cursor performing an operation with relation to the space might otherwise have had to determine on that cursor's own, including information about columns as well as partitions and those partitions' respective segment addresses. In step 224, the version of metadata is maintained within the database. The version of metadata may be in any form capable of conveying those characteristics to a cursor, such as in a cached object or in a structure in the database.

In step 226, a proxy object is generated and maintained within the database. For example, database system 100 may generate and maintain proxy object 150. This proxy object indicates the current version of metadata for the indicated data storage space. In step 228, the proxy object is linked to the version of metadata created in step 222. For example, database system 100 may link proxy object 150 to version of metadata 140. Steps 222-228 may not necessarily occur in the indicated order. For example, the proxy object may be created before the version of metadata. Furthermore, a proxy object might not need to be created if one already exists or if other techniques for determining the latest version of metadata are available. Finally, the proxy object may be a versioned object, wherein the version of metadata is maintained. The process flow then returns to step 230.

In step 230, a determination is made concerning whether a cursor implementing a plan capable of performing the indicated operation is already maintained within the database. Mechanisms for such a determination may be as simple as looking up the request, or portions thereof, in a cursor mapping, or may require more complex steps such as generalizing the request with, for instance, parameters, and looking up the generalized request. If such a cursor does exist, the process flow continues to step 240.

Otherwise, in step 232, a plan to implement the indicated operation is determined. This plan may be based substantially upon the request received in step 210. It may also include other steps implied or otherwise necessitated by the indicated operation. In step 234, compiled code is generated for the plan. This compiled code references a proxy object indicating the current version of metadata for the indicated data storage space. This proxy object may have been created at some point previously, such as in step 226.

In step 236, this compiled code is maintained by the database system as a cursor. The cursor may be maintained in a variety of forms known within the art. For instance, it may be maintained as an object in a cache. It may also be maintained itself as separate metadata or as structured data. From here, the process flow returns to step 240.

In step 240, the execution of the cursor begins in order to begin performance of the indicated operation. As part of execution, in step 242, the latest version of metadata available for the indicated space is determined. The cursor may access a proxy object, such as the one referenced in step 232, to determine the latest version of metadata available. In step 244, the cursor is then bound to the latest version of metadata available for the indicated space. Linking the cursor to the version of the metadata may be performed anytime before the cursor requires access to the indicated space. Finally, in step 246, execution of the cursor is completed, thereby performing the indicated operation.

Responding to Metadata Changes

Certain operations performed on a data storage space may change the characteristics described in the metadata utilized by cursors. Such operations may include, for example, operations requiring the addition or deletion of partitions, as well as the addition or removal of columns of data in a table. Consequently, a new version of metadata describing the space must be created to reflect the resulting changes. Mechanisms for creating new versions of metadata in response to changes in data storage spaces are well known within the art, and are described in U.S. application Pub. No. 20060004886 entitled "System for managing versions of cached metadata," filed on May 13, 2005.

Figure 3:
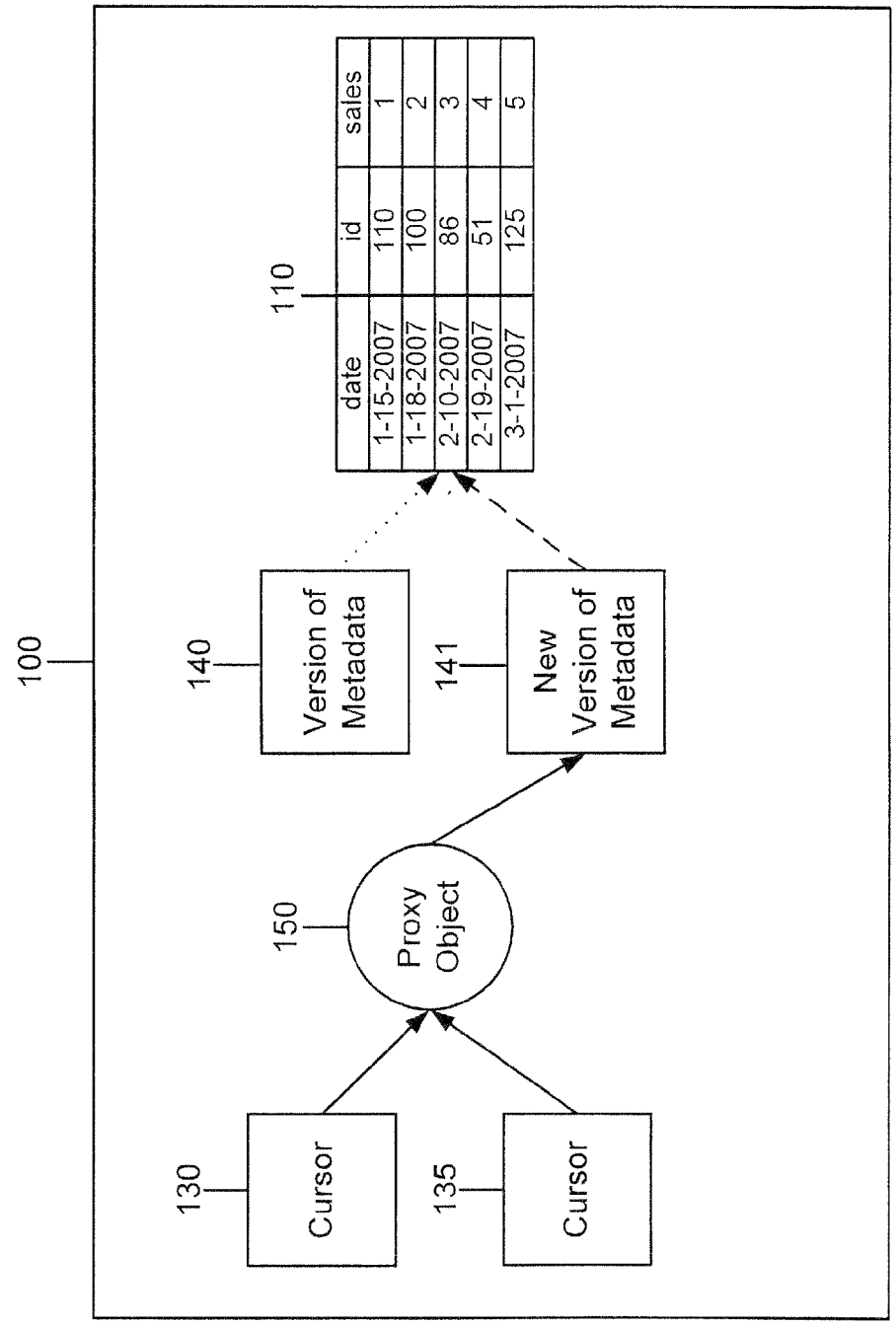
FIG. 3 illustrates the effect of creating a new version of metadata upon the exemplary database system of FIG. 1B according to an embodiment of the invention

FIG. 3 illustrates the effect of creating a new version of metadata upon the exemplary database system of FIG. 1B according to an embodiment of the invention. As a result of an operation that has changed a described characteristic of data storage space 110, version of metadata no longer accurately describes the characteristics of space 110. Thus, a new version of metadata 141 has been created. Proxy object 150 has also been changed in response to the creation of a new version of metadata, so that it now indicates that version of metadata 141 is the current version of metadata for space 110.

Because of this change in proxy object 150, any cursor subsequently executed will be bound to new version of metadata 141 instead of version of metadata 140. Since the cursors reference the proxy object 150 instead of versions of metadata directly, the cursors do not need to be recompiled. Meanwhile, any cursors executed prior to the change in proxy object 150 may continue to execute using version of metadata 140. Version of metadata 140 will persist in the database system until it is no longer needed for any executing cursors. Mechanisms for maintaining a version of metadata until no longer needed are described in U.S. application Pub. No. 20060004755 entitled "System for allowing object metadata to be shared between cursors for concurrent read write access," filed on May 13, 2005.

Though not depicted in FIG. 3, database system 100 may also employ other versioning and locking mechanisms, as known within the art, to maintain the consistency of data in space 110.

Re-Linking to New Metadata in the Middle of Execution

According to one embodiment, certain cursors using a previous version of metadata may need to re-link to a new version of metadata in the middle of execution. For example, this may be required if a cursor that has performed an operation that resulted in the creation of new metadata later requires access to that new metadata in order to finish executing its plan. One example of such a plan is a plan for an insert operation that implicitly requires the creation of a new partition as a result of interval partitioning (described in co-pending U.S. application Ser. No. 11/764,121 entitled "Interval Partitioning," filed on the even date herewith).

To accommodate the need for re-linking, a cursor may release the prior version metadata in the middle of execution. It may then access the referenced proxy object to request the address for the latest version of metadata. A cursor may do this after, for example, it knows that a new version of metadata has been created as a result of the cursor adding a new partition.

Exemplary Process Flow

FIG. 4 is a flowchart illustrating database operations according to one embodiment of the invention. Steps similar to those depicted in process flow 400 have already been described in detail, but process flow 400 illustrates how these steps interact with each other as multiple requests to perform operations (i.e. queries) are received at the database system. For simplification, certain depicted steps may be abbreviations of previously described steps, or may imply execution of a previously described step.

In step 410, a first query pertaining to a first space is received at a database system. In step 412, a first version of first metadata is created. The first metadata describes characteristics of the first space. In step 414, a first plan to perform the first query is compiled. In step 416, performance of the first query begins via beginning to execute the compiled first plan. In step 418, as part of the process of executing the first plan, the first plan is bound to the first version of the first metadata. In step 420, execution of the first plan is completed. At this time, the binding between the first plan and the first version of the first metadata is terminated.

In step 430, a second query pertaining to the first space is received. In step 432, a second plan to perform the second query is compiled. In step 434, performance of the second query begins via beginning to execute the compiled second plan. In step 436, as part of the process of executing the second plan, the second plan is bound to the first version of the first metadata.

In step 440, a characteristic of the first space described by the first metadata is changed. In step 442, a new version of the first metadata is created to reflect this change.

In step 450, a third query pertaining to the first space is received. In step 452, it is determined that the third query may be performed using the first plan. In step 454, performance of the third query begins via beginning to execute the compiled first plan. In step 456, as part of the process of executing the third plan, the third plan is bound to the new version of the first metadata, since it is the latest version of metadata available for the first space. In step 458, execution of the third plan is completed. At this time, the binding between the third plan and the new version of the first metadata is terminated.

In step 460, execution of the second plan is completed. At this time, the binding between the second plan and the first version of the first metadata is terminated. In step 462, the first version of the first metadata is dropped, as it is no longer bound to any cursors.

It should be noted that at no time does process flow 400 require the re-compilation of any plans, despite the fact that a new version of the first metadata has been created.

According to one embodiment, as discussed before, a proxy object may be used to facilitate the binding of the plans to the versions of metadata. Thus, compilation steps would comprise referencing the proxy object in the compiled code for the plan. The steps of binding plans to versions of metadata would comprise accessing the proxy object to determine the address of the latest version of the first metadata. Additional steps would be required to link newly created versions of the first metadata to the proxy object, so that the proxy object correctly indicates the latest version of the first metadata.

Hardware Overview

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    generating multiple versions of first metadata describing characteristics of a space within a database, each different version of the multiple versions generated in response to one or more different changes in one or more of the characteristics of the space;
    maintaining first proxy data that indicates a location of a current version of the multiple versions of the first metadata;
    generating a compiled plan for executing one or more database operations with respect to items in the space within the database, the compiled plan including a reference to a location of the first proxy data;
    while executing the compiled plan, based on the reference to the first proxy data in the compiled plan: determining the location of the current version of the first metadata using the first proxy data, accessing the current version of the first metadata at the determined location, and utilizing the current version of the first metadata to execute at least an aspect of the one or more database operations;
    wherein the method is performed by one or more computing devices.

2. The method of claim 1, further comprising, while executing the compiled plan:
    accessing the first proxy data a first time, wherein at the first time the first proxy data indicates that a first version of first metadata is the current version of first metadata;
    based on the first proxy data indicating that the first version of first metadata is the current version of first metadata, utilizing the first version of the first metadata to execute at least a first aspect of the one or more database operations;
    accessing the first proxy data a second time, wherein at the second time the first proxy object indicates that a second version of first metadata is the current version of first metadata;
    based on the first proxy data indicating that the second version of first metadata is the current version of first metadata, utilizing the second version of the first metadata to execute at least a second aspect of the one or more database operations.

3. The method of claim 1 wherein the first proxy data is a versioned object, further comprising two or more of the multiple versions of the first metadata.

4. The method of claim 1 wherein executing the compiled plan occurs in response to receiving a first database query that may be implemented using the plan.

5. The method of claim 1, wherein executing the compiled plan occurs at a first time, a first version of the first metadata is the current version of the first metadata at the first time, executing the compiled plan at the first time comprises utilizing the first version of the first metadata to execute the aspect of the one or more database operations, and the method further comprises the steps of:
creating a new version of the first metadata to reflect a change in a characteristic of the space;
after executing the compiled plan at the first time, without recompiling the plan, executing the compiled plan at a second time; and
while executing the compiled plan at the second time, based on the reference to the first proxy data in the compiled plan: utilizing the new version of the first metadata to execute the aspect of the one or more database operations.

6. The method of claim 1 wherein the space is a table.

7. The method of claim 6 wherein the characteristics of the space described by the first metadata include one or more of: a number of partitions within the space and a number of columns within the space.

8. The method of claim 1 wherein the first metadata comprises data indicating addresses of one or more segments of the space.

9. The method of claim 1 wherein the one or more database operations were specified in an SQL query or a DDL operation.

10. The method of claim 1 wherein the compiled plan accepts a parameter, and wherein the execution of the compiled plan differs according to the value of the parameter.

11. The method of claim 1, wherein the compiled plan is a cursor.

12. The method of claim 1, wherein the first proxy data comprises pointers to at least two of the multiple versions of the first metadata.

13. A method of executing queries in a database, comprising the steps of:
receiving a first query pertaining to a first space;
creating a first version of first metadata describing characteristics of the first space;
generating a first compiled plan to perform the first query;
executing the first query using the first compiled plan and the first version of the first metadata;
receiving a second query pertaining to the first space;
determining that the second query is capable of being performed with the first compiled plan; and
in response to a change in a characteristic of the first space, creating a new version of the first metadata describing the characteristics of the first space;
without having recompiled the first compiled plan since the step of generating the first compiled plan, executing the second query using the first compiled plan and the new version of the first metadata;
wherein the method is performed by one or more computing devices.

14. The method of claim 13 wherein the first metadata comprises data indicating addresses of segments of the first space.

15. The method of claim 14 wherein the first compiled plan accepts a parameter, and wherein execution of the first compiled plan differs according to the value of the accepted parameter.

16. The method of claim 13 wherein the first query and the second query are both one of an SQL query or a DDL statement.

17. The method of claim 13 further comprising:
prior to compiling the first plan, creating a first proxy object, wherein the first proxy object indicates a current version of the first metadata;
accessing the first proxy object while executing the first query, wherein, while executing the first query, the first proxy object indicates that the first version of the first metadata is the current version of the first metadata;
accessing the first proxy object while executing the second query, wherein, while executing the second query, the first proxy object indicates that the new version of the first metadata is the current version of the first metadata; and
compiling the first plan to include data referencing a location of the first proxy object; and.

18. The method of claim 13, wherein the first compiled plan is a cursor.

19. The method of claim 13, further comprising:
receiving a third query pertaining to the first space;
generating a second compiled plan to perform the third query; and
executing the third query using the second compiled plan and the first version of the first metadata;
wherein execution of the third query completes after beginning the step of executing the second query.

20. One or more non-transitory computer-readable media storing instructions that, when executed by one or more the computing devices, cause:
generating multiple versions of first metadata describing characteristics of a space within a database, each different version of the multiple versions generated in response to one or more different changes in one or more of the characteristics of the space;
maintaining first proxy data that indicates a location of a current version of the multiple versions of the first metadata;
generating a compiled plan for executing one or more database operations with respect to items in the space within the database, the compiled plan including a reference to a location of the first proxy data;
while executing the compiled plan, based on the reference to the first proxy data in the compiled plan: determining the location of the current version of the first metadata using the first proxy data, accessing the current version of the first metadata at the determined location, and utilizing the current version of the first metadata to execute at least an aspect of the one or more database operations.

21. The one or more non-transitory computer-readable media of claim 20, wherein the instructions, when executed by the one or more computing devices, further cause, while executing the compiled plan:
accessing the first proxy data a first time, wherein at the first time the first proxy data indicates that a first version of first metadata is the current version of first metadata;
based on the first proxy data indicating that the first version of first metadata is the current version of first metadata, utilizin the first version of the first metadata to execute at least a first aspect of the one or more database operations;
accessing the first proxy data a second time, wherein at the second time the first proxy object indicates that a second version of first metadata is the current version of first metadata;

based on the first proxy data indicating that the second version of first metadata is the current version of first metadata, utilizing the second version of the first metadata to execute at least a second aspect of the one or more database operations.

22. The one or more non-transitory computer-readable media of claim 20, wherein the first proxy data is a versioned object, further comprising two or more of the multiple versions of the first metadata.

23. The one or more non-transitory computer-readable media of claim 20, wherein executing the compiled plan occurs in response to receiving a first database query that may be implemented using the plan.

24. The one or more non-transitory computer-readable media of claim 20, wherein executing the compiled plan occurs at a first time, a first version of the first metadata is the current version of the first metadata at the first time, executing the compiled plan at the first time comprises utilizing the first version of the first metadata to execute the aspect of the one or more database operations, and the instructions, when executed by the one or more computing devices, further cause:
  creating a new version of the first metadata to reflect a change in a characteristic of the space;
  after executing the compiled plan at the first time, without recompiling the plan, executing the compiled plan at a second time; and
  while executing the compiled plan at the second time, based on the reference to the first proxy data in the compiled plan: utilizing the new version of the first metadata to execute the aspect of the one or more database operations.

25. The one or more non-transitory computer-readable media of claim 24 wherein the space is a table.

26. The one or more non-transitory computer-readable media of claim 25 wherein the characteristics of the space described by the first metadata include one or more of: a number of partitions within the space and a number of columns within the space.

27. The one or more non-transitory computer-readable media of claim 20 wherein the first metadata comprises data indicating addresses of one or more segments of the space.

28. The one or more non-transitory computer-readable media of claim 20, wherein the one or more database operations were specified in an SQL query or a DDL operation.

29. The one or more non-transitory computer-readable media of claim 20, wherein the compiled plan accepts a parameter, and wherein the execution of the compiled plan differs according to the value of the parameter.

30. The one or more non-transitory computer-readable media of claim 20, wherein the compiled plan is a cursor.

31. The one or more non-transitory computer-readable media of claim 20, wherein the first proxy data comprises pointers to at least two of the multiple versions of the first metadata.

32. One or more non-transitory computer-readable media storing instructions that, when executed by one or more computing devices, cause:
  receiving a first query pertaining to a first space;
  creating a first version of first metadata describing characteristics of the first space;
  generating a first compiled plan to perform the first query;
  executing the first query using the first compiled plan and the first version of the first metadata;
  receiving a second query pertaining to the first space;
  determining that the second query is capable of being performed with the first compiled plan; and
  in response to a change in a characteristic of the first space, creating a new version of the first metadata describing the characteristics of the first space;
  without having recompiled the first compiled plan since the step of generating the first compiled plan, executing the second query using the first compiled plan and the new version of the first metadata.

33. The one or more non-transitory computer-readable media of claim 32, wherein the first compiled plan is a cursor.

34. The one or more non-transitory computer-readable media of claim 32 wherein the first metadata comprises data indicating addresses of segments of the first space.

35. The one or more non-transitory computer-readable media of claim 32, wherein the first query and the second query are both one of an SQL query or a DDL statement.

36. The one or more non-transitory computer-readable media of claim 35 wherein the first compiled plan accepts a parameter, and wherein execution of the first compiled plan differs according to the value of the accepted parameter.

37. The one or more non-transitory computer-readable media of claim 32 wherein the instructions, when executed by the one or more the computing devices, further cause:
  accessing the first proxy object while executing the first query, wherein, while executing the first query, the first proxy object indicates that the first version of the first metadata is the current version of the first metadata;
  accessing the first proxy object while executing the second query, wherein, while executing the second query, the first proxy object indicates that the new version of the first metadata is the current version of the first metadata; and
  compiling the first plan to include data referencing a location of the first proxy object; and.

38. The one or more non-transitory computer-readable media of claim 32, wherein the instructions, when executed by the one or more computing devices, further cause:
  receiving a third query pertaining to the first space;
  generating a second compiled plan to perform the third query; and
  executing the third query using the second compiled plan and the first version of the first metadata;
  wherein execution of the third query completes after beginning the step of executing the second query.

* * * * *

UNITED STATES PATENT AND TRADEMARK OFFICE
CERTIFICATE OF CORRECTION

PATENT NO.         : 8,140,493 B2
APPLICATION NO.    : 11/764126
DATED              : March 20, 2012
INVENTOR(S)        : Waddington et al.

It is certified that error appears in the above-identified patent and that said Letters Patent is hereby corrected as shown below:

On Title Page 2, Item (56) in column 2, under "Other Publications", insert -- U.S. Appl. No. 11/764,129, filed Jun. 15, 2007, Office Action Dated Oct, 05 2010. --.

On Title Page 2, Item (56) in column 2, under "Other Publications", insert -- U.S. Appl. No. 11/764,129, filed Jun. 15, 2007, Office Action Dated Jul, 20 2010. --.

On Title Page 2, Item (56) in column 2, under "Other Publications", insert -- U.S. Appl. No. 11/764,131, filed Jun. 15, 2007, Final office Action Dated Dec, 07 2010. --.

On Title Page 2, Item (56) in column 2, under "Other Publications", insert -- U.S. Appl. No. 11/764,131, filed Jun. 15, 2007, Office Action Dated Jul, 11 2011. --.

On Title Page 2, Item (56) in column 2, under "Other Publications", insert -- U.S. Appl. No. 11/764,121, filed Jun. 15, 2007, Office Action Dated Aug, 03 2011. --.

In column 3, line 29, after "invention" insert -- . --.

In column 11, line 22, in Claim 6, delete "claim 1" and insert -- claim 5 --, therefor.

In column 12, line 18, in Claim 17, delete "object; and." and insert -- object. --, therefor.

In column 12, line 30, in Claim 20, after "one or more" insert -- of --.

In column 12, line 61, in Claim 21, delete "utilizin" and insert -- utilizing --, therefor.

In column 14, line 34, in Claim 37, after "one or more" insert -- of --.

In column 14, line 45, in Claim 37, delete "object; and." and insert -- object. --, therefor.

Signed and Sealed this
Twenty-third Day of October, 2012

David J. Kappos
*Director of the United States Patent and Trademark Office*